Jan. 3, 1950  J. F. KENURE ET AL  2,493,457
PLUG AND SOCKET CONNECTION
Filed July 19, 1945
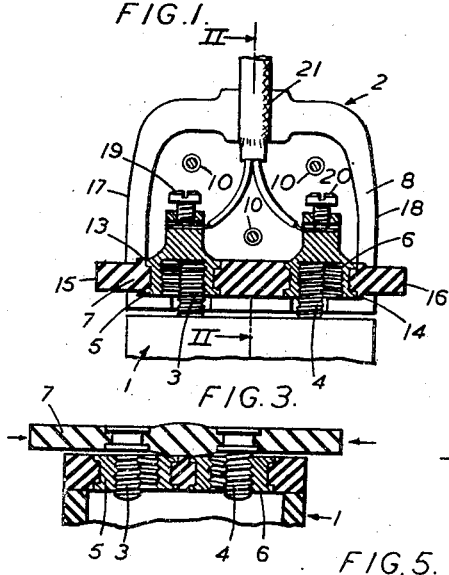
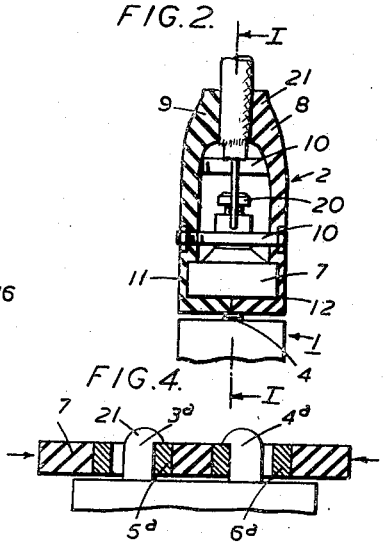
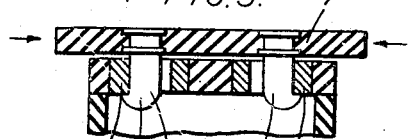
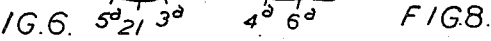
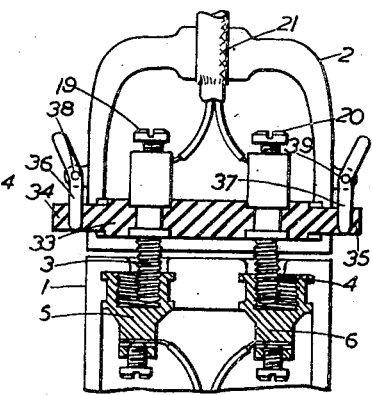
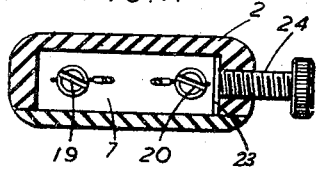
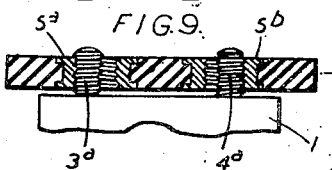
Inventors
JOHN FRANCIS KENURE
HERBERT FREDERICK WHITMARSH
By Whittemore, Hulbert & Belknap
Attorneys Patented Jan. 3, 1950

2,493,457

UNITED STATES PATENT OFFICE 2,493,457

PLUG AND SOCKET CONNECTION

John Francis Kenure, Feltham, and Herbert Frederick Whitmarsh, London, England

Application July 19, 1945, Serial No. 605,875
In Great Britain October 6, 1944

8 Claims. (Cl. 173—328)

This invention concerns improvements in or relating to plug and socket connections in which two units are connected together by the interengagement of male and female coupling members in the form of spaced plug pins and sockets, a set of at least two of which are provided in and/or on each of the two units, and, although the invention is applicable to plug and socket connections in general, it has especial reference to electric plug and socket connections.

More particularly the invention is concerned with plug and socket connections wherein the coupling members of one of the two cooperating units are mounted for movement towards and away from one another and are constantly urged in one of these directions by resilient means in order to urge them into relative positions such that their distance apart is different from the distance between the cooperating coupling members, and the invention resides in that the first named coupling members are carried by a deformable resilient or elastic strip or block carried by the plug or socket unit to which they belong, and in that means are provided to enable the said strip or block to be stressed, i. e. expanded or compressed, to bring the coupling members carried thereby temporarily into alignment with the said cooperating coupling members.

The coupling members on the two units to be connected may be provided with interlocking devices, for example, a screw thread or one or more teeth, projections or serrations on the one coupling member adapted to engage in a co-operating screw thread, or one or more notches or serrations in the co-operating coupling member, or a tooth, projection or the like on the one coupling member adapted to engage behind an end or shoulder of the other coupling member.

The stressing or straining of the said deformable strip or block may be effected by manual effort applied thereto directly or applied indirectly through a mechanical contrivance such as, for example, a lever or levers or a screw. The spacing of the set of coupling members of the deformable member may be greater than that of the co-operating coupling members of the other unit so that the deformable member has to be compressed to attain registration and interengagement of the coupling members of the two units to be connected, or the arrangement may be vice-versa.

The said deformable member may comprise a piece of rubber, or a piece of polyvinyl chloride material or other suitable thermoplastic synthetic resin material, e. g., a piece of synthetic rubber, or indeed any suitable material which has sufficient cohesion but which is sufficiently resilient or elastic or self-restoring for the purpose.

In order that the invention may be thoroughly understood certain embodiments of the same will now be described with reference to the accompanying drawings in which:

Figure 1 shows a plug and socket connection for use with two lead electrical devices, the socket unit having relatively movable sockets and being shown in vertical section, the section being taken along line I—I, Figure 2;

Figure 2 is a section on line II—II, Figure 1;

Figure 3 shows diagrammatically a similar arrangement to Figures 1 and 2 in which the pins of the plug unit, instead of the sockets of the socket unit, are relatively movable;

Figures 4 and 5 respectively show diagrammatically arrangements of the kind illustrated in Figures 1 and 3 but wherein the form of the pins and sockets is modified;

Figures 6 and 7 respectively illustrate in vertical and horizontal section a modification of the plug shown diagrammatically in Figure 3 and shows one form of mechanism for adjusting the plug pins relatively to one another;

Figure 8 illustrates a modification of the arrangement shown in Figure 3, wherein the pins of the plug are arranged so as to require separation instead of needing to be moved towards one another in order to engage or disengage the plug unit with or from the socket unit; and Figure 9 shows diagrammatically a modification of the arrangement shown in Figure 8.

Referring to Figures 1 and 2 of the accompanying drawings it will be seen that the coupling comprises two units, namely, a unit 1 and a unit 2. In these figures the unit 1 is the plug unit being provided with a pair of parallel spaced cylindrical fixed metal male coupling members or contact pins 3 and 4 which are externally screw threaded, whilst the unit 2 is the socket unit and is provided with a pair of metal, internally cylindrical female coupling members or contact sockets 5 and 6. These sockets are internally screw threaded and their internal diameter substantially exceeds, but is less than twice, the external diameter of the pins 3 and 4.

The sockets are mounted, in spaced relationship and with their axes parallel, in a deformable resilient strip or block 7 of rubber, polyvinyl chloride material, or like resilient electrically insulating material. The strip 7 is of rectangular prismatic form and for its major part is enclosed between the two rigid halves 8 and 9 of the socket unit 2, the parts 8 and 9 being secured together by bolts 10.

The parts 8 and 9 of the socket unit are oppositely recessed, as shown at 11 and 12, Figure 2, to receive the longitudinal edges of the strip 7 so that the strip is positioned firmly against bodily movement up or down in the unit.

The strip 7 is reduced in cross sectional area towards its ends as seen at 13 and 14, Figure 1, so that the strip is, by the engagement of the shoulders so formed on the strip with the walls of the socket unit, prevented from slipping endwise out of the unit.

The end portions 15 and 16 of the strip 7 project, in the manner of lugs, outwardly beyond the lateral external surfaces 17 and 18 of the socket unit so as to provide a pair of pressure portions which may be urged towards one another to compress the strip in an endwise direction so as to decrease the spacing between the two sockets 5 and 6 carried thereby.

The distance between the centres of the two sockets 5 and 6 is, when the strip 7 is normal or de-compressed, greater than the distance between the centres of the plug pins 3 and 4 by a distance less than the diameter of one of the said pins whereby, when the pins and sockets are interengaged, the screw threaded portions of the sockets nearest the axial centre line of the socket unit are in engagement with the adjacent threading of the corresponding pins of the plug unit, as clearly shown in Figure 1. With the parts in these positions, the natural resilience of the strip 7 urges the sockets apart and into firm interlocking engagement with the pins.

To release the plug unit 1 from the socket unit 2, pressure is applied by finger and thumb to the ends 15 and 16 of the strip 7 to compress this in an endwise direction and so to move the sockets 5 and 6 towards one another, i. e., in a direction transverse to their axes, in order to disengage these sockets from the pins 3 and 4 so as to enable the latter to be drawn axially out of the sockets. After the plug unit has been disconnected from the socket unit, the strip 7 is released and automatically returns the sockets 5 and 6 to their original positions.

If it is again required to connect the plug and socket units together, the strip 7 is once again compressed in an endwise direction to decrease the spacing of the sockets 5 and 6 and to enable the pins 3 and 4 to be inserted in the sockets, after which the strip is released so that the sockets move outwardly to engage the inner parts of the plug unit pins and lock the plug and socket units together.

The sockets 5 and 6 are respectively provided with terminal screws 19 and 20 to which electric leads, entering the socket unit through an opening 21, may be connected.

In the modified arrangement diagrammatically shown in Figure 3 the deformable resilient strip 7 carries the pins 3 and 4 instead of the sockets 5 and 6, the latter being carried in fixed relationship by the unit 1 which, in this case, constitutes the socket unit instead of the plug unit. In this arrangement the distance between the centres of the pins 3 and 4 is greater, in the decompressed or normal condition of the strip 7, than the distance between the centres of the sockets 5 and 6, instead of vice versa.

Figures 4 and 5, respectively, diagrammatically illustrate modifications of the arrangements illustrated in Figures 1 and 3, the modification residing in the forms of the pins and sockets. In these figures the pins are respectively marked 3a and 4a, whilst the sockets are marked 5a and 6a, and it will be seen that instead of being internally threaded the sockets have plain cylindrical interior surfaces, whilst the pins are similarly unthreaded but are provided with hooked over ends 21 adapted to engage over the back ends of the sockets to lock the pins in the sockets and against withdrawal therefrom. Interengagement or withdrawal of the pins in or from the sockets is achieved by external compression of the strip 7 as hereinbefore described with reference to Figures 1, 2 and 3.

Figure 6 and 7 show a method of mechanically compressing, in an endwise direction, the strip 7 of the construction previously described with reference to Figures 1, 2 and 3, such mechanical compression being effected indirectly by manual effort instead of by direct manual effort as in Figures 1, 2 and 3.

In the construction illustrated in Figures 6 and 7 the ends of the resilient strip 7 do not extend beyond the side walls of the unit 2, one end of the strip abutting the internal surface 22 of one wall of the unit 2 whilst the other end of the strip is provided with a metal wearing plate 23 against which bears the inner end of a screw 24. The latter is screw-threadedly mounted in the rigid part of the unit 2 such that, by rotating the screw in one direction or the other, the strip 7 is compressed endwise or, if previously compressed, is permitted to expand endwise.

In all the embodiments of the invention above described the contacts, i. e., the pins 3 and 4 or the sockets 5 and 6, are urged away from one another by resilient means and the contacts are brought into coupling position by a directly or indirectly manually-applied compressive force urging the contacts towards one another. The contrary arrangement is illustrated in the modifications shown in Figures 8 and 9, wherein the contacts are normally resiliently drawn together and are brought into position for engagement with the co-operating contacts by mutual separation.

In the arrangement shown in Figure 8 the unit 2 carries the pins 3 and 4 and the unit 1 carries the sockets 5 and 6. The pins 3 and 4 are mounted in an elastic strip 33 formed of rubber of other suitable material, the pins 3 and 4 normally having a distance between their centres less than the distance between the centres of the sockets 5 and 6, so that when the pins are engaged with the sockets they are held in interlocking engagement therewith, the pins being externally screw threaded and the sockets internally screw threaded.

In order to engage the pins with the sockets or to disengage them from the sockets it is necessary to separate the pins to some extent by extending the elastic member 33. This can either be done manually, by pulling outwardly upon the ends 34 and 35 of the member 33, or by means of levers 36 and 37 pivoted at 38 and 39 respectively to the unit 2. The levers 36 and 37 each have one arm anchored in the protruding end of the elastic member 33 and the other arm adapted to be pressed inwardly towards the body of the unit 2 to extend the elastic member 33, the two upper arms of the levers 36 and 37 being conveniently grasped between the fingers and thumb of the operator's hand for the purpose of extending the elastic member 33.

Figure 9 shows a modification of the arrangement illustrated in Figure 8, the modification merely consisting in the elastic members carrying sockets 5a and 5b instead of the pins 3 and 4, these pins being replaced by pins 3a and 4a rigidly carried in the unit 1.

In all the constructions described, both elements of a pair of sockets or a pair of pins have been movable for disengaging the plug from the socket. It will be appreciated, however, that only one of these members could be movable and the other fixed.

Although the invention has, by way of example, been described as applied to connecting two electrical units together, it should be understood that the invention may be used for other purposes, e. g., for securing a lid or cover to a container, in which case the pins would be carried by the lid or cover or by the container whilst the sockets would be carried by the other of these members. Where a positive lock is required the pins may have projections, as, for example, described with reference to Figure 4 or 5, or, where a less positive securement is required, the pins could be of the form shown in Figure 3 or 9 for example. If the pins are carried by the lid or cover and the sockets are relatively movable with respect to one another, two, three or more pins or sockets could be moulded integrally with the lid or cover.

What we claim is:

1. In combination an electrical plug unit and an electrical socket unit, said plug unit comprising a casing, a plurality of spaced contact pins each adapted to interengage the corresponding socket of a plurality of relatively fixed sockets in the socket unit, and a longitudinally resilient strip housed within said casing and carrying said pins in spaced relationship, such pins being movable towards and away from one another transversely of their axes by longitudinally compressing and releasing said strip, said strip acting on said pins normally to retain them at a greater distance apart than the distance between the fixed sockets.

2. In a multi-pin plug and socket connection, a connection unit comprising a substantially rigid casing, parallel spaced coupling members mounted in said casing for relative movement transversely of their axes, a deformable self-restoring strip housed within said casing and carrying the said coupling members in spaced relationship, said strip extending from end to end of said casing, and means in the latter for preventing transverse flexing of said strip, a further connection unit for co-operation with the first named connection unit, a complementary coupling member for each of said first named coupling members, such complementary coupling members being carried in spaced relationship in the said further connection unit and their spacing being different from that of the first named coupling members, interlocking means adapted to lock the co-operating coupling members of the said two connection members against accidental axial relative movement when interengaged, and means disposed outside said casing and at, at least, one end of the said deformable strip for stressing the latter temporarily, to adjust the spacing of the coupling members carried thereby to agree with the spacing of the said complementary coupling members in order to enable the coupling members of the two connection units to be interengaged or disengaged.

3. A plug and socket connection according to claim 2, wherein the said coupling members and cooperating coupling members are respectively screw-threaded pins and internally screw threaded integral sockets, the latter being of larger internal diameter than the external diameter of said pins.

4. In a multi-pin plug and socket connection, a connection unit comprising a substantially rigid casing, a set of parallel spaced coupling members mounted in said casing for relative movement transversely of their axes, a deformable resilient self-restoring strip housed within said casing with its longitudinal edges disposed in recesses in the walls of the latter, said strip carrying the said coupling members in spaced relationship therealong and said strip extending from end to end of said casing, a further connection unit for co-operation with the first named connection unit and having a set of complementary coupling members each of which is adapted for interengagement with one of said first named coupling members, such complementary coupling members being rigidly carried by said further connection unit with a different spacing from that of the first named coupling members, one set of said coupling members being screw-threaded pins and the other set being internally screw-threaded integral sockets each of greater internal diameter than the co-operating pin, and means, disposed outside said casing and unitary with the connection unit of which the casing forms a part, for longitudinally stressing the said deformable strip temporarily to modify the spacing of the coupling members carried thereby for interengagement with, or disengagement from, the said complementary coupling members.

5. A multi-pin plug and socket connection according to claim 4 wherein the said casing is furnished with openings at its ends adjacent the said deformable strip and the ends of the latter project through these openings to the exterior of the casing to provide the means for stressing the strip.

6. A multi-pin plug and socket connection according to claim 5 wherein levers are pivoted to the ends of said casing, such levers having arms engaging the ends of said strip, which project from the said casing, for stressing the strip from the exterior of the casing.

7. A multi-pin plug and socket connection according to claim 4 including a screw rotatably mounted in one end of said casing for longitudinally compressing the said rubber strip from the exterior of the casing to adjust the spacing of the coupling members carried by the strip.

8. In a multi-pin plug and socket connection, a connection unit comprising a substantially rigid hollow casing, a set of parallel spaced coupling members mounted in such casing for relative movement transversely of their axes, an endwise compressible resilient strip mounted in said casing and carrying the said coupling members at spaced positions therealong, means for positioning such strip adjacent one end of its unit and for restraining it against inward or outward transverse flexing, a further connection unit for co-operation with the first named connection unit and rigidly carrying a pair of spaced complementary coupling members for co-operation with the first named coupling members, the spacing of the said complementary coupling members being different from that of the normal spacing of the first named coupling members, and means on said first named connection unit for longitudinally compressing the said resilient strip from the exterior of the said casing temporarily to modify the spacing of the coupling members carried by the strip whereby to enable such coupling members to be engaged with, or disengaged from, the coupling members of the said further connection unit.

JOHN FRANCIS KENURE.
HERBERT FREDERICK WHITMARSH.

REFERENCES CITED

The following references are of record in the file of this patent:

UNITED STATES PATENTS

| Number | Name | Date |
| --- | --- | --- |
| 1,119,864 | Ovington et al. | Dec. 8, 1914 |
| 1,645,650 | Kirkman | Oct. 18, 1927 |
| 1,668,583 | Carter | May 8, 1928 |
| 1,890,484 | Allenic | Dec. 13, 1932 |
| 1,941,374 | Weisberg | Dec. 26, 1933 |
| 2,092,044 | La Bar | Sept. 7, 1937 |
| 2,118,361 | Schaeffer, Jr. | May 24, 1938 |
| 2,126,494 | Means | Aug. 9, 1938 |
| 2,136,193 | Karst | Nov. 8, 1938 |
| 2,195,546 | Townsend | Apr. 2, 1940 |
| 2,254,754 | Reece | Sept. 2, 1941 |
| 2,289,172 | Beal | July 7, 1942 |
| 2,316,555 | Bugg | Apr. 13, 1943 |
| 2,390,852 | Stee | Dec. 11, 1945 |